Dec. 7, 1943.  C. C. SCHRADER  2,336,193
CORK SPINNING COT AND METHOD OF MAKING THE SAME
Filed Sept. 22, 1939
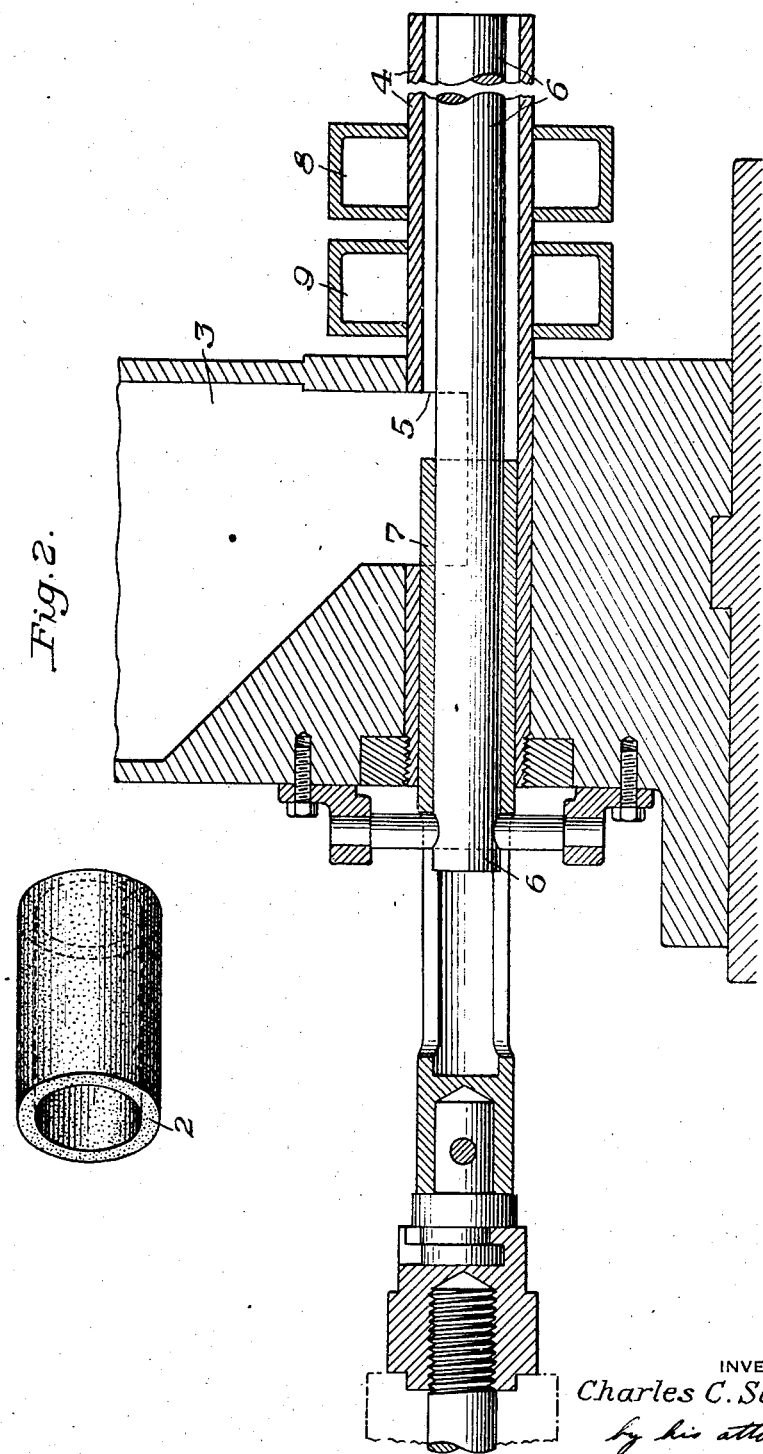
INVENTOR
Charles C. Schrader
by his attorneys Patented Dec. 7, 1943

2,336,193

UNITED STATES PATENT OFFICE 2,336,193

CORK SPINNING COT AND METHOD OF MAKING THE SAME

Charles C. Schrader, Lancaster, Pa., assignor to Armstrong Cork Company, Lancaster, Pa., a corporation of Pennsylvania Application September 22, 1939, Serial No. 296,057

13 Claims. (Cl. 18—55)

This invention is for a spinning cot or like article formed of cork and to the method of making the same.

Cork spinning cots have heretofore been manufactured from granulated cork by mixing the granulated cork with a binder, placing predetermined amounts by weight of the cork granules and the binder in a mold, subjecting the mass to heat and pressure and thereby forming a slab or mat of bonded cork granules. The thickness of this mat is substantially the same as the length of the cot to be formed, and the cot is formed by punching or cutting tubular cork sleeves from the mat. The longitudinal axis of the cot so formed is in the same direction as the direction in which the cork is compressed in forming the mat. This is a particularly desirable feature because if the axis of the cot were perpendicular to the direction in which the compressible force were applied to compact the cork, the cork particles would more readily flake out and detach themselves from the body of the cot. While cots made in this way have been extensively used and have performed satisfactorily, there have been certain recognized defects. In the first place, where a mass of loose granules are charged into a forming mold and subjected to heat and pressure, progressive and differential heating occurs and the friction of the cork material against the walls of the mold offers a tremendous resistance to the packing of the material with the result that there is a wide variation in the density of the cork mats between the surface and the mid-portions of the mats, the composition adjacent the faces of the mat being much more dense than the cork in the central portion of the mat. When a sleeve-like member is punched from this mat to produce a cot, a similar density gradient exists in the finished article, that is the mid-portion of the cot is less dense than the cork at the ends. In the spinning of yarn, most of the fibres pass over the surface of the cot between the ends with the result that the most work is done where the cork body is the least dense and the least satisfactory for performing the work. There is a variation in density between the ends and the mid-section of cots made by the mat process ranging from 3 to 5 lbs.

In the manufacture of cots by the mat process a grade of cork known to the trade as 14–20 mesh cork was determined to be satisfactory because it produced a cot of a desired density and texture, and it has been regarded that any considerable variation or departure would be detrimental to the finished product.

Attempts have heretofore been made to form cots by the cork extrusion process. According to this process a plunger reciprocating in an extrusion barrel compacts the cork particles in a space between a mandrel and the interior of the barrel. The material is forced into the barrel by the plunger in small amounts, the plunger serving both to feed the material into the barrel and to thereafter force the increments of material so fed against the end of the previously formed mass already compacted in the tube. As additional increments of granulated cork and binder are forced into the tube, the bonded mass is forced along the tube toward the open end thereof and as it moves along the tube, the compacted mass is heated to set the binder. If the mass of compacted material is not kept moving through the extrusion tube at a sufficiently high rate, it will freeze or become impacted in the tube and completely resist further efforts to move it, and if the machine continues to operate the extrusion tubes or barrels may be disrupted. On the other hand, if the resistance of the material to movement through the tube is not sufficient, the material will not be compacted to the desired density and will be unsatisfactory for use. The manufacture of cork cots by the extrusion process has been unsatisfactory because of the difficulty of controlling the density of the molded composition and of securing a sufficiently high density in an extruding process while maintaining the desired rate of movement of the material through the extruding tube to prevent the material from freezing therein. It has been my experience in the extrusion of a 14–20 mix, for example, that the extrusion process will operate satisfactorily providing the density of the cots is sufficiently low, but just as soon as the machine is operated to produce cots in the required density range, particularly in the preferred density range around 29 lbs. per cubic foot, the material becomes impacted and the process cannot be continued on a commercially satisfactory basis. Not only is there difficulty in the operation of the machine, but the product itself is quite erratic when attempts are made to bring it up to the desired density.

There are several reasons for these difficulties. In the first place, in order to secure a satisfactory cot having the desired density and surface characteristics and texture, cork grains must be used as distinguished from cork flour, and the bulk of the material must be comprised of grains which are not too small. Because of the peculiar characteristics of cork it is not commercially possible to screen it to a definite mesh size. The best that can be done is to screen it to a certain range of mesh sizes. When cork is screened to a 14–20 mesh size there is no assurance that the average size particles will be midway between the 14–20 meshes. The average size particles may in one batch be closer to the 20 end of the range and another batch be closer the 14 end of the range, and due to segregation of the particles in handling of the cork, there may be quite a difference in the size of the average particle in different parts of the same batch. This would not make any difference in the mat process of forming cork cots because the material, in the mat process is charged into the molds by weight. In the extrusion process, the feeding of the material is determined by volume, the movement of the plunger enabling a certain small volume of material to flow into the extrusion tube on each reciprocation of the plunger. Where the average size particles are coarse, a given volume will be of different weight than the same volume of particles when they are fine, and consequently the density of the resulting product varies in the extrusion of a 14-20 mesh mix depending on whether the average size particles are running toward the coarse end of the range or the fine end of the range.

I have found that another reason for the difficulty which has been encountered and which seriously affects the density of the resulting product is the re-expansion which occurs in the extruded mass after it emerges from the extrusion tube. As the compacted mass of cork particles and binder moves through the extrusion tube under high pressure, the individual grains of cork are squeezed and compressed. While the function of the binder is to unite the particles while they are under compression, yet a definite expansion takes place both longitudinally and radially of the mass when it emerges from the extrusion tube and the pressure is relieved. Not infrequently the re-expansion occurs to an extent such that the article has a pebble surface instead of a completely smooth one, and the re-expansion is greater where the average size particles are coarser than where the average size particles are smaller. The re-expansion of the mass reduces the density and as the re-expansion usually occurs unevenly, it produces material variations in the density of different cots and in different portions of the same cot.

According to the present invention, I provide a method of producing spinning cots in which the density of the cots as a whole is closely controlled and in which the variation in density between relatively small sections thereof is extremely slight, the variation in density from end to end ordinarily being well within ½ lb. as distinguished from 3 to 5 lbs. in cots made by the mat process, the variation also being much less than in cots heretofore made by the extrusion process. It is possible, according to my invention, to produce a cot having a selected density according to the particular requirements of the spinning machine or fibre with which a given cot is required to be used. A cork textile cot should possess a density within the range of 26 lbs. to 34 lbs. per cubic foot and in most cases the density should range between 29 to 31 lbs. per cubic foot. According to my invention I may controllably produce a cot having any selected density in this range as for example, a cot having a density of 29 or 30 as the case may be, and as above stated, the variation in density will not ordinarily be more than ½ lb. above or below the selected density.

My invention may be more fully understood by reference to the accompanying drawing in which Figure 1 is a perspective view of a cork spinning cot of the type to which the present invention pertains; and Figure 2 is a longitudinal vertical section through a more or less conventional form of extruding apparatus.

Referring to the drawing, the cot comprises a ferrule or sleeve 2 formed of a molded cork composition, the shaping of the mass being effected by extrusion.

Referring to Figure 2, the conventional apparatus for extruding cots and similar articles comprises a hopper 3 having an extrusion tube or barrel 4 at the base thereof cut away at 5 to permit material in the hopper to fall into the tube. 6 designates a stationary mandrel extending through the barrel or tube 4 and 7 is a forming ram or plunger that reciprocates within the tube or barrel 4 and outside the mandrel 6. A heating chamber 8 surrounds the barrel and between the heating chamber and the hopper is a cooling chamber 9. Cooling fluid is circulated through the chamber 9 to prevent the heat from traveling back into the hopper, whereas a heating fluid is circulated through the chamber 8 for causing the binder in the cork mix to set or cure.

The apparatus shown in Figure 2 is more or less conventionally illustrated and the machine per se forms no part of the present invention but has been described merely for the purpose of illustration.

The apparatus in the practice of the present invention is also operated in the usual manner. When the ram 7 is withdrawn to the position shown in Figure 2, a small mass of loosely granulated cork and binder flows from the hopper 3 through the opening 5 into the tube 4 around the mandrel. The plunger 7 then moves forward and a small quantity of cork granules and binder is forced into the extrusion barrel and compacted against the previously formed mass of the compacted cork mix. As additional increments of the cork mix are forced in and compacted in this way, the mass is caused to travel along the barrel 4 and be extruded from the discharge end.

Cork has a high coefficient of friction. When the particles are compressed in the barrel 4 they of course tend under pressure to flow in both a longitudinal and a radial direction. Because of the pressure in a radial direction, the mass builds up a very great resistance to movement in a longitudinal direction through the tube or barrel 4. When the cork mix which has been compacted is heated thereby expanding the air in the cork cells and in the space between the cork particles, still further pressure is developed to resist the movement of the bonded mass through the tube. Without some resistance to the movement of the mass through the tube there would of course be no compacting action and the mix would not be molded or would not be compacted to any satisfactory extent. On the other hand, if the resistance of the cork to movement through the tube is too great, the mass "freezes" in the tube and as further increments of cork are added, pressure is built up adjacent the end of the ram that expands and destroys the barrel 4 without the cork mass moving at all. Also, the mass will freeze in the tube if it is not kept moving through the tube at a sufficient speed. In the practice of the present invention a mix is prepared in which the mesh of the cork granules is of an order of fineness considerably smaller than the mesh heretofore used for the production of spinning cots by the mat method or for the production of articles by cork extrusion methods.

I have found that by using a cork mix in which substantially none of the cork particles are larger than 20 mesh and in which the average particle size is less than 20 mesh, cots having the desired qualities of density, texture and resilience may be produced by extrusion and that such a mix may be extruded at a commercially satisfactory rate without the material freezing and material can be compacted to produce cots of the desired density. When such a mix is used, the cots are of uniform density and by proper variation of the mix, the density of the cots may be increased or decreased at will. Such re-expansion of the extruded material as takes place is more nearly uniform and does not detrimentally affect the extruded cots.

I have found that if I employ in a cork composition cork of 24-34 mesh size produced by the attrition or Ball and Jewell mill process, the material may have a density of between 29 and 31 lbs. per cubic foot. The density of a cork textile cot should be in a range between 26-34 lbs. per cubic foot, the density being varied according to the surface or type of fibre that the cot is operating upon. For general service, a density of 29-31 lbs. has been found to be most desirable. Throughout this specification the term "mesh" is intended to refer to the U. S. standard sizes.

As previously mentioned, it is not commercially possible to screen cork to one mesh size. For practical purposes it is, therefore, necessary to use a mix in which there is a considerable range in the mesh size. Also, because of the peculiar nature of cork, a mix made up of cork over a specified range as for example, 24-34 mesh will not be uniform. Some particles will be larger than 24 mesh and other particles will be finer than 34 mesh. In preparing a 24-34 mesh batch of granulated cork, the following is the particles specification as used for the purpose of grading:

*Particle specification*

All shall pass a standard 18 mesh sieve.
Not more than traces shall appear on a 20 mesh sieve.
Not over 15% cumulative shall be retained on a 25 mesh sieve.
Not more than 15% cumulative shall pass a 35 mesh sieve.
Not more than 2% shall pass a 40 mesh sieve.

A typical run of material meeting this particle specification will be as follows:

*Typical screen analysis (U. S. standard screens)*

| Screen | Per cent retained |
|---|---|
| 18 | 0.0 |
| 20 | Trace |
| 25 | 5.0 |
| 30 | 49.7 |
| 35 | 34.2 |
| 40 | 10.2 |
| Pan | 0.9 |
| | 100.0 |

In reducing raw cork material to granulated form, the raw material may be reduced in either a buhr mill, an attrition mill, or a Ball and Jewell mill. I have found that cork granules produced by the buhr mill process may be less satisfactorily employed in an extrusion process and will give less uniform density than cork which has been prepared by an attrition or Ball and Jewell mill process. The cork particles produced by the Ball and Jewell mill process have substantially the same characteristics as cork produced by the attrition mill process, and in referring to the granulated cork mix which is employed in the present invention, I refer to cork produced either by attrition or the Ball and Jewel mill process and intend to exclude except as otherwise indicated, cork produced by the buhr mill process.

A typical mix used in the preparation of cots according to the present invention is prepared from a 24-34 mesh cork produced by the attrition or the Ball and Jewel mill process and screened to the particle specification above set forth. With this granulated cork I mix a binder comprised of gelatin glue 12½ parts by weight, glycerine 12½ parts by weight, and water 20 parts by weight. This binder is mixed with 100 parts by weight of cork and 1½ parts by weight of paraformaldehyde plus a satisfactory lubricant such as paraffin and rubber latex if such lubricant is necessary. A mix of the above character may be extruded with an inside bore of 1⅜" and an outside diameter of 1 5/32" at the rate of from 2½ to 3½" per minute and with a high degree of uniformity and with a density range between 29 to 31 lbs. The particular formula recited is a preferred formula and may be departed from according to the hardness or softness of the composition desired. For example if more glycerine is added, the composition will be softer and if less glycerine is added, the composition will be harder.

If a lower density material is desired as for example material having its density between 26-28 lbs. per cubic foot, substantially the same formula as that given above is employed excepting instead of using a 24-34 mesh size, a 20-30 mesh cork would be used. Substantially the same rate of extrusion would be obtained and the machine could be operated without any major hold-up due to freezing of the material. If a higher density material is desired as for example, the density between 32-34 lbs. per cubic foot, the granulated cork would be of a 26-36 mesh.

Also, while the basic mix may comprise cork with 20-30 mesh particles, there may also be incorporated with the basic mix additional material ranging from 20-50 mesh for the purpose of reaching the final desired density but the greater bulk of the mix should be in the basic range. The same procedure may also be used where the basic material is a 24-34 mesh cork in which case the added material would be from 24 to approximately 50 mesh and less of this addition material would be used to secure the same increase in density. The use of fine particles tends to make an article having a smooth surface and improves the appearance of the finished article when it is buffed.

While it is quite satisfactory to introduce a 20-50 mesh material for example with 20-30 particles, it would not be satisfactory to use 20-50 mesh material alone for the reason that the average size grain would be too small to impart the desired qualities of density or texture to the cot. In adding a 20-50 mesh filler to 20-30 mesh particles, the greater proportion of the total volume of the mix should comprise material in the range between 20 and 30 meshes. This is what is meant by stating that the greater bulk of the mix should be comprised of particles in the basic range. The same thing of course holds true where a 24-50 mesh material is mixed with 24-34 mesh material or in any other range. Aside from this fact considerable lee-way is permissible in the amount of filler that may be used with the basic mix. It should also be noted that the material which is added as a filler should not have the maximum selected particle size larger than the maximum selected particle size in the basic mix as this would produce undesirable variations in density. For example, it would not be desirable to mix 20–50 mesh material with 24–34 mesh material.

In the mat process of forming cots, the ratio of cork to binder is approximately 5 parts to 1 part by weight whereas with the present extrusion process, the ratio is approximately 4 to 1, more binder being used in proportion to the same amount by weight of cork. The increase in ratio of binder to cork renders the final product considerably tougher and more wear-resistant and enables the article to have a smoother surface for textile use. In order to secure substantially complete tanning of the gelatin glue, I prefer to employ as shown by the example above given, an excess of paraformaldehyde. After the extruded article has been formed, it is preferably stored at atmospheric temperature for a period of 6 months in order to complete the tanning and render the article extremely tough and durable. Also, by letting the articles stand in storage for a considerable length of time before they are used, the glue in the article is substantially completely tanned and the paraformaldehyde is thereby dissipated. Consequently, when glue is applied to the interior of the cot to secure it to the textile roll, there is not sufficient paraformaldehyde present to tan this adhesive and difficulty arising from this source is thus eliminated.

As previously stated, according to the present method, cots are successfully formed by extrusion through the use of a cork mix in which the largest selected size does not exceed 20 mesh, although as previously indicated, the cork is not susceptible to close grading and a mix having a 20 mesh maximum size will contain a small amount of particles of slightly larger size but the proportion is so small that it does not affect the quality of the cot or the problem of extrusion. The method further correlates the selection of the maximum grain size to the density of the article to be produced as for example, the maximum selected grain size for a 26 lb. density is 20 mesh, whereas the maximum selected grain size for 29–31 lb. density is 24 mesh. If, for example, an attempt were made to produce a dense cot in the range of 29–31 lbs. from a large particle size cork mix, difficulty would not only be encountered due to the mechanical problems of extruding such large particles to secure so high a density, but upon ejection of the formed product from the extrusion barrel re-expansion occurs which necessarily decreases the density.

The invention provides a cot or similar article which has the advantages of a cot made by the mat method in that the cork particles are compressed and compacted by pressure applied in the direction of the axis of the cot and it has the advantage over a cot made by the mat method of being extremely uniform in density from end to end. If a mix is selected for example, to produce a cot having a density of 29 lbs. per cubic foot and the extrusion machine is set to operate at a speed to secure such a density, the maximum variation along the length of the cot will not exceed ½ lb., and the difficulty of having a portion of the cot between the ends substantially softer than the ends is avoided. It will be understood, of course, that the extrusion operation is carried on more or less continuously, the formed product coming out of the extrusion barrel as a continuous tube which is thereafter cut into lengths so that there is no reason for the density or texture of the cork in one part of a given cot to be any different from that in another part. Because of the uniformity of the product and the fact that its density can be controlled by selection of the grain size, the articles can be molded almost to the finished diameter, requiring very little dressing or buffing of the surface to be performed to render the cot usable. Because of the more uniform density of the article, more uniform results are secured from its use and the usable life may be more definitely predicted, and the intervals between the re-buffing or re-dressing of the cots are proportionately longer.

It will be observed that the density of the cot expressed in pounds per cubic foot is a figure between the maximum and minimum mesh sizes of the predominant portion of the cork base of the mix as for example, when the density is between 29 and 31 lbs., the basic cork composition is 24–34 mesh, whereas when the density is about 26–28 lbs., the basic cork mesh is in the range of 20–30. Where the density is in the neighborhood of 32–34 lbs., the basic mixture is 26–36 mesh. While I have stated that there may be incorporated with the basic mix a filler which extends over a much wider range of mesh sizes as for example, with a basic mix of 20–30 mesh cork particles, there may also be employed a filler of 20–50 mesh cork particles the basic mix itself may not satisfactorily spread over such a broad range because the average sized particle in a 20–50 mesh mass of granulated cork would be considerably less than the average sized particle in a 20–30 mesh mass and therefore would be too fine for the proper practice of the invention within the density range recited. Since, in the grading of cork it is impossible in a 20–30 mesh mix for example, to exclude some stray particles of a slightly larger size than 20, the term "selected maximum grain size" has been used to express the desired maximum limit and define the mesh of the mix without excluding these possible and practically inevitable stray larger sized particles.

While I have given certain preferred examples of mixes for carrying out my invention and have illustrated a cot or like article of more or less specific dimensions, it will be understood that this is merely by way of illustration and that various changes and modifications may be made in the invention.

I claim:

1. The method of extruding spinning cots or the like having a density of 26 pounds per cubic foot or greater which comprises forming a mix of granulated cork and a binder where the mix is formed predominantly of a graded mass of cork particles in a range covering approximately 10 screen meshes with the middle of the range closely coinciding with the figure representing the desired density expressed in pounds per cubic foot of the article to be produced and in which the maximum selected mesh size does not exceed 20, and compacting said mix and molding the same by extrusion.

2. The method of extruding spinning cots or the like having a density of 26 pounds per cubic foot or greater which comprises forming a mix of granulated cork and a binder where the mix is formed predominantly of a graded mass of cork particles in which the maximum selected grain size does not exceed 20 mesh and is of a size related to the desired density in the finished article and wherein the said mass covers a range of mesh sizes from a mesh size over the number indicating the desired density of the article to be produced expressed in pounds per cubic foot to a mesh size slightly under such number, and extruding said mix when so prepared.

3. The herein described method of forming spinning cots and the like of uniform and predetermined density from a mix of granulated cork and a binder which comprises preparing and extruding a mix from a binder and a mass of granulated cork particles formed predominantly of particles of a mesh size ranging between from 20–30 mesh to a mesh size ranging between 26–36 mesh size, the range being selected according to the desired density of the product, and wherein the selected mesh size of none of the particles is greater than the maximum in the range which is employed.

4. The method of making spinning cots having a substantially uniform density of approximately 26 pounds per cubic foot or greater which comprises extruding a mix of cork granules and a binder wherein the mix is prepared predominantly of a basic mass of cork particles of a selected grain size not exceeding 20 mesh and covering a range of selected maximum to minimum grain size of approximately 10 meshes with the figure expressing the density of the product to be formed in pounds per cubic foot coinciding with a figure between the maximum and minimum grain sizes.

5. The method of making spinning cots having a substantially uniform density of approximately 26 pounds per cubic foot or greater which comprises extruding a mix of cork granules and a binder wherein the mix is prepared predominantly of a basic mass of cork particles of a selected grain size not exceeding 20 mesh and covering a range of selected maximum to minimum grain size of approximately 10 meshes with the figure expressing the density of the product to be formed in pounds per cubic foot coinciding with a figure between the maximum and minimum grain sizes, the basic mix also having added thereto a filler of cork particles wherein the selected maximum grain size does not exceed the maximum grain size of the basic mix and wherein the minimum grain size may be substantially smaller than the minimum selected grain size of the basic mix.

6. The herein described method of forming spinning cost and the like having a substantially uniform density of approximately 26 pounds per cubic foot or greater by an extrusion method of molding which comprises preparing and extruding a mix of cork particles and a binder in which the mix is prepared from a basic mass of granulated cork graded to a mesh range from a maximum mesh size which is not larger than 20 to a minimum which is a number less than the number expressing the desired density of the cot to be produced in pounds per cubic foot in which the range from maximum to minimum is not substantially greater than the 10 meshes.

7. The herein described method of forming spinning cots and the like having a substantially uniform density of approximately 26 pounds per cubic foot or greater by an extrusion method of molding which comprises preparing and extruding a mix of cork particles and a binder in which the mix is prepared from a basic mass of granulated cork graded to a mesh range from a maximum mesh size which is not larger than 20 to a minimum which is a number less than the number expressing the desired density of the cot to be produced in pounds per cubic foot in which the range from maximum to minimum is not substantially greater than 10 meshes, and adding to the basic mass of cork other cork particles graded over a mesh range substantially greater than the mesh range of the basic mass but in which the largest mesh does not exceed the largest mesh of the basic mass.

8. The method of forming spinning cots by extrusion wherein such cots have a predetermined density which is substantially uniform as between the different parts of the same cot and as between different cots of the same desired density which comprises extruding said cots from a mix of a binder and cork particles wherein the maximum selected size of the cork particles does not exceed 20 meshes and wherein the size of the particles of the bulk of the mix is between 20 and 36 meshes.

9. The method of forming spinning cots by extrusion wherein such cots have a predetermined density which is substantially uniform as between the different parts of the same cot and as between different cots of the same desired density which comprises extruding said cots from a mix of a binder and cork particles wherein the maximum selected size of the cork particles is in the range between 20 and 30 meshes and is a figure less than the density of the cot expressed in pounds per cubic foot, and wherein the size of the particles of the bulk of the mix is between 20 and 36 meshes.

10. The method of forming spinning cots and the like of a predetermined density of approximately 26 pounds per cubic foot or greater by extrusion which comprises forming an extrudable mix of cork particles and a binder in which the greater proportion of the entire bulk of the mix is formed of particles between 20 and 36 meshes with the maximum selected mesh size of any grain in the mix being a figure between 20 and the figure expressing the density of the cot.

11. The method of making spinning cots of a substantially uniform and predetermined density of approximately 26 pounds per cubic foot or greater which comprises preparing and extruding a mix from a binder and a mass of granulated cork particles formed predominantly of particles of a mesh size not exceeding 20 mesh and wherein the maximum selected mesh size of any grain is between 20 and the figure expressing the predetermined density of the cot.

12. A spinning cot or like article having a density of approximately 26 pounds per cubic foot or greater comprising an extruded compacted mass of cork granules and a binder in which the maximum selected grain size of cork is 20 mesh or smaller, when made according to the process defined in claim 11.

13. A spinning cot or like article having a density of approximately 26 pounds per cubic foot or greater comprising an extruded compacted mass of cork granules and a binder in which the maximum selected grain size of cork is 20 mesh or smaller and in which the greater part of the volume of the mass is comprised of granules of a mesh size ranging between 20 and 36 meshes, when made in accordance with the process of claim 8.

CHARLES C. SCHRADER.